US010669994B1

(12) United States Patent
Kucic

(10) Patent No.: US 10,669,994 B1
(45) Date of Patent: Jun. 2, 2020

(54) MULTI-COLUMN WIND TURBINE TOWER AND ERECTION METHOD

(71) Applicant: Joseph R. Kucic, North Aurora, IL (US)

(72) Inventor: Joseph R. Kucic, North Aurora, IL (US)

(*) Notice: Subject to any disclaimer, the term of this patent is extended or adjusted under 35 U.S.C. 154(b) by 0 days.

(21) Appl. No.: 16/258,977

(22) Filed: Jan. 28, 2019

(51) Int. Cl.
*E04H 12/34* (2006.01)
*F03D 13/20* (2016.01)
*F03D 13/10* (2016.01)

(52) U.S. Cl.
CPC ............ *F03D 13/20* (2016.05); *E04H 12/342* (2013.01); *F03D 13/10* (2016.05); *F05B 2230/61* (2013.01); *F05B 2240/912* (2013.01); *F05B 2240/916* (2013.01); *F05B 2260/02* (2013.01)

(58) Field of Classification Search
CPC ....... E04H 12/18; E04H 12/344; E04H 12/10; F03D 11/045; B66C 23/348; E21B 7/02; E02D 27/42
See application file for complete search history.

(56) References Cited

U.S. PATENT DOCUMENTS

| | | | | |
|---|---|---|---|---|
| 7,735,290 | B2 | 6/2010 | Arsene | 52/651.01 |
| 7,993,107 | B2 | 8/2011 | Gevers | 416/244 R |
| 8,302,365 | B2 | 11/2012 | Gee | 52/745.17 |
| 9,038,348 | B1* | 5/2015 | Fang | E04B 1/19 |
| | | | | 52/651.01 |
| 2007/0240622 | A1* | 10/2007 | Hu | E04H 12/10 |
| | | | | 114/90 |
| 2010/0326734 | A1* | 12/2010 | Wasterval | E21B 15/00 |
| | | | | 175/220 |
| 2012/0023860 | A1 | 2/2012 | Voss | 52/651.09 |
| 2014/0345218 | A1* | 11/2014 | Larsen | E02D 27/425 |
| | | | | 52/299 |
| 2015/0167644 | A1 | 6/2015 | Fang et al. | F03D 11/04 |
| 2016/0130832 | A1* | 5/2016 | Zavitz | F03D 13/10 |
| | | | | 52/40 |
| 2016/0376807 | A1* | 12/2016 | Johnson | E04H 12/34 |
| | | | | 269/45 |
| 2017/0114777 | A1* | 4/2017 | Sanz Pascual | F03D 13/20 |
| 2017/0241407 | A1* | 8/2017 | Joss | F03D 13/20 |
| 2017/0321659 | A1* | 11/2017 | V | E04H 12/10 |
| 2019/0093381 | A1* | 3/2019 | Perez García | E04H 12/10 |

OTHER PUBLICATIONS

National Renewable Energy Laboratory, "WindPACT Turbine Design Scaling Studies Technical Area 3-Self-Erecting Tower and Nacelle Feasibility", DOE NREL/SR-500-29493, Contract DE-AC36-99-GO10337 (May 2001).
Engstrom, S., et al., "Tall towers for large wind turbines," Report from Vindforsk project V-342 Höga torn för vindkraftverk (Jul. 2010).

* cited by examiner

*Primary Examiner* — Gisele D Ford
(74) *Attorney, Agent, or Firm* — Benjamin D. Rotman; Rosenbaum IP, P.C.

(57) ABSTRACT

The invention is a wind turbine tower and method of erection. The wind turbine tower comprises a plurality of support columns coupled to a wind turbine tower base, a lift deck coupled to the plurality of support columns configured to traverse a central longitudinal axis of the wind turbine tower, and a nacelle housing assembly coupled to the top of the plurality of support columns. The plurality of support columns spans a height of at least 85 meters may and in some embodiments are constructed of individual column segments transported and assembled via a small crane supported by the lift deck.

20 Claims, 14 Drawing Sheets

MULTI-COLUMN WIND TURBINE TOWER AND ERECTION METHOD

BACKGROUND OF THE INVENTION

The present invention generally relates to wind turbine towers. More particularly, the present invention relates to the construction and erection of multi-column wind turbine towers.

Utility scale wind turbines built in the 1980's and 1990's comprise wind machinery set on top of simple lattice towers that are less than 60 meters tall. These simple lattice towers are similar to electrical transmission line lattice pylon structures and lattice cell towers and are designed to use minimal amounts of steel material. Additionally, the wind machinery set atop these towers is placed there with the use of large cranes.

Current land-based (onshore) utility scale wind turbine towers are limited to an average of 80 to 85 meters hub height. The most economical tower configuration is the tapered cylindrical monopole tower. The bases of the towers for the 80 meter height are 4.3 meter diameter since larger diameters cannot ship conveniently over normal highways due to interferences. The towers have reached their maximum diameter, plate thickness, and material grade. There are roughly a dozen other tower details that can overcome the transportation limitations but they are only used at about 15% of the installations. This is generally because the lift of the larger size nacelles to greater height requires larger cranes. The alternate tower details are used where the site conditions or soils will permit use of larger cranes. Larger cranes are limited in availability, rental cost, and transportation cost.

Additionally Current land-based utility scale wind turbine nacelles are limited to about 2 MW to 2.5 MW. The mass of the power nacelles is large enough at this size that very large cranes (cranes of 600 ton to 1,000 ton capacity) are required to lift the nacelles to height. There are a limited number of large cranes. It is very expensive to transport the cranes in and out of the remote project sites often requiring 100 to 150 truckloads. The allowable soil bearing capacities at many agricultural sites are not adequate for these larger cranes and extensive and expensive site improvements are required to accommodate the cranes for the large nacelle lift. A great amount of site improvement is required to move the larger cranes between individual tower pads at a given wind farm location. Extensive equipment design alterations are made to allow erection of the power nacelles in smaller components. Advancing the industry to 5 MW nacelles at 150 meter height would require a minimum of 1,250 ton capacity or larger. Industry leaders are currently installing 10 MW nacelles offshore and are in production with 12 MW nacelles for testing. These most probably would take cranes of 2,000 ton capacity or larger.

The US Department of Energy indicates that there are significantly more potential wind resources above 140 meter hub height. The 12 southeastern states have a wind potential at 80 meters of only about 8 GW but this goes to approximately 1,626 GW above 140 meters. The northeast states of OH and PA go from 1 GW to 211 GW. West coast states CA, AZ, NV and OR go from 25 GW to 538 GW. The potential for land wind in these three regions goes from only 7% to 475% of total American commercial electricity production. The wind resources near these load and population centers are more than adequate to provide for their electric power needs. Producing power from land-based wind is only about 30% of the cost of offshore and will almost certainly remain less costly than offshore regardless of the advances made in offshore installation costs. Nacelles of 8 MW are already certified and produced for offshore and designs for 10 to 15 MW nacelles will be available in less than 5 years. These larger nacelle designs could easily segue into use on land with an innovation that allows taller towers and erection of more powerful nacelles.

Multiple attempts in the prior art have been made to remedy the issue of constructing taller onshore towers that support larger nacelles. U.S. Pat. No. 8,302,365 issued Nov. 6, 2012 entitled, "Partially self-erecting wind turbine tower," describes and illustrates a partially self-erecting wind turbine tower and a method for carrying out the assembly thereof. The invention discloses an extendable pylon column with at least three legs. The invention has legs that extend from an installed retracted position to an extreme extended position. The extendable pylons are driven by a gear to extend and then lock. The wind machinery, or nacelle is then attached to the top hub.

Additional prior art applications such as US Patent Application No. 2012/0023860A1 published Feb. 2, 2012 entitled, "Adapter Configuration for a Wind Tower Lattice Structure," describes a lattice structured tower having a plurality of vertically oriented columns and cross-braced members. The disclosure of the wind tower construction comprising a lattice structure with vertically oriented columns and cross-braced members, as well as an adapter molded onto the top of the lattice structure such that the top portions of the columns are embedded into the adapter provides a mostly conventional structure. The invention discloses that the adapter be poured of concrete, with the columns embedded in said adapter.

Additional prior art applications such as US Published Patent Application No. 2015/0167644A1 published Jun. 18, 2015 entitled, "Lattice tower assembly for wind turbines," describes a lattice tower assembly for a wind turbine. The invention discloses a lattice tower assembly comprising a plurality of structural members connected together to define an open lattice tower, the structural members comprising a plurality of outer cross-support members, the inner and outer cross-support members being connected between the supports so as to define one or more openings, wherein each of the inner cross-support members overlaps one of the outer cross-support members. The invention also discloses a lattice tower covering comprised of panel elements. The design of the invention seeks to remedy the size restrictions of larger turbines.

In yet another prior art reference, U.S. Pat. No. 7,993,107 granted Aug. 9, 2011 entitled, "Onshore wind turbine with tower support system," describes a tower support system provides support to the tower and includes an axially extending circumferential sleeve mounted around the tower. Therein is disclosed a tower with a nacelle, a tower base end configured for support on a ground level foundation, and tower support system. The tower is constructed of tubular members with a constant diameter around the location of the support sleeve. The sleeve is constructed in a concentrically spaced location with the tubular supports equally spaced around the sleeve.

In yet another prior art reference, U.S. Pat. No. 7,735,290 granted Jun. 15, 2010 entitled, "Wind turbine assembly tower," describes a method for constructing a turbine tower with a first section having three legs. The invention discloses the first tower comprising three legs diverging from the longitudinal axis forming a first tower section. Additionally, it discloses a second tower section coupled to the first, with an additional leg extending parallel to the legs of the first section. It also discloses shear panels connecting between adjacent upper sections and the legs to increase torsion stiffness. The lower legs extend out further from the midpoint of the tower, with the upper legs being near vertical in position.

What is needed is an efficient, cost effective wind turbine structure which comprises a sturdy and robust configuration that is capable of reaching greater heights and which can be transported to the erection site over the nation's highways without violating transportation restrictions. Also needed is a method of erecting said taller wind turbine tower structure and heavy topside mechanisms without the need for the physically large and heavy lift cranes that are now standard within this industry or the use of a separate temporary lift tower.

SUMMARY OF THE INVENTION

In view of the above, in order to meet the goals and provide the necessary structure and method of construction, this invention is directed to an exceptionally tall (over 85 meters) wind turbine tower, as well as the method for constructing inland or offshore towers and lifting the nacelle without the need for a large crane (cranes having a lifting capacity of about 600 tons or above). The lack of need for a large lift crane may allow this tower and method to be referred to as self-erecting.

In a first embodiment, the wind tower is multi-column, comprising at least four columns, with intermediate bracings between the columns to add stability, rigidity and robust resistance to high wind speeds that will be encountered at the increased elevations. The columns are spaced at predetermined distances to allow load distribution as well as to allow the lift equipment used for tower erection to be disposed central to the towers and operated accordingly. In this embodiment, the tower column configuration is configured to accommodate a work deck and lift platform to be temporarily disposed between the columns from base to hub height and facilitate the erection of the tower and placement of topside mechanisms. The work deck and lift deck further comprise a mechanism that permits 3-axis movement to provide lifting power and precise movement of the parts during construction. Thus, there is herein disclosed a multi-column MW rated wind turbine tower having multi-column sections, a concrete foundation wide enough to support the multiple columns and the MW rated nacelle.

In another aspect of the invention, there is disclosed a method of construction of such wind turbine tower comprising a work deck and lift deck combination wherein a relatively small crane can be mounted and maneuvered for use in erecting the tower column base through top components. In this embodiment the lift deck may comprise a common rack and pinion drive system such as one used in the offshore oil drilling deck systems that permits the lift deck to rise in the space between final wind turbine tower columns. The lift deck may further comprise mechanisms configured to allow controlled X-X and Y-Y movement of the deck surface to provide precise movement of the carried items, with the climbing deck to have sufficient lift capacity for the extreme weights of the current and future wind turbine tower top side mounted structures and mechanisms.

In this embodiment, the main climbing deck can be constructed in easily transportable components that connectively attach together at the project site and fit in the space between final tower columns and may have extendable work decks that translate outwards from the main deck to allow more worker surface to reach more tower parts with handrails and other worker safety devices. The lifting deck will have sufficient load and lift capacity to support the weight of the operating mechanisms, connection structure, and transport machinery in a concentric or eccentric configuration while stationary or while climbing. The tower and erection method will also allow for a mechanism or structural member that permits temporary support of the lifted items at an intermediate location up the final tower.

The parts of the tower are considerably less cumbersome than the current tower constructions for equivalent tower height and nacelle power. This allows for readily transportable components to any road or railroad connected location. In one aspect of the invention, the spacing of the columns that allows the location of the nacelle or climbing deck between the columns. This allows the final wind tower columns to act as the climbing tower columns thus eliminating the need for separate climbing towers with their cost of erection, removal and the large ground-based crane that would be needed to perform this work. The use of the small crane mounted onto the work deck permits the final tower to be self-erecting. The large load capacity lift deck between the columns allows the wind generation mechanisms and their support and attachment to tower structure to be lifted to final height by the relatively compact lift deck and drive mechanisms, thus eliminating the need for large capacity ground-based lift cranes that require large shipping costs, assembly costs, and highly improved site work pads and access pathways.

The ability of the climbing deck mechanism to move the tower top-side mechanism with precision in the X-X and Y-Y direction allows for near ground assembly of very large and heavy transportable assemblies near ground level for easy worker access and safety. It also allows for movement of the loads to optimize loads into each of the final tower columns. It also allows the loads to be transmitted into the tower columns in a manner that is inside the physical boundaries of the columns which eliminates the transmission of undesirable moments due to weight or imposed loads such as excess wind load that might occur if a fast-moving storm should hit the site while the equipment was under erection.

The temporary support frame/structure in combination with the high capacity lift deck allows the handling of many heavy separate wind mechanisms on site without the requirement or need for a heavy lift crane. The 200 or 500 ton machine items can be taken right to their final tower and removed with simple connection to these frames. This allows convoys of heavy machine parts to arrive and offload at more than one tower footprint site without the need to move a heavy lift crane. The use of several smaller lift decks means that the critical path for the overall site is not dependent on the availability of the heavy lift cranes.

The methods, systems, and devices are set forth in part in the description which follows, and in part will be obvious from the description, or can be learned by practice of the methods, devices, and systems. The advantages of the methods, devices, and systems will be realized and attained by means of the elements and combinations particularly pointed out in the appended claims. It is to be understood that both the foregoing general description and the following detailed description are exemplary and explanatory only and are not restrictive of the methods, devices, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE PREFERRED EMBODIMENTS

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Figure 1A:
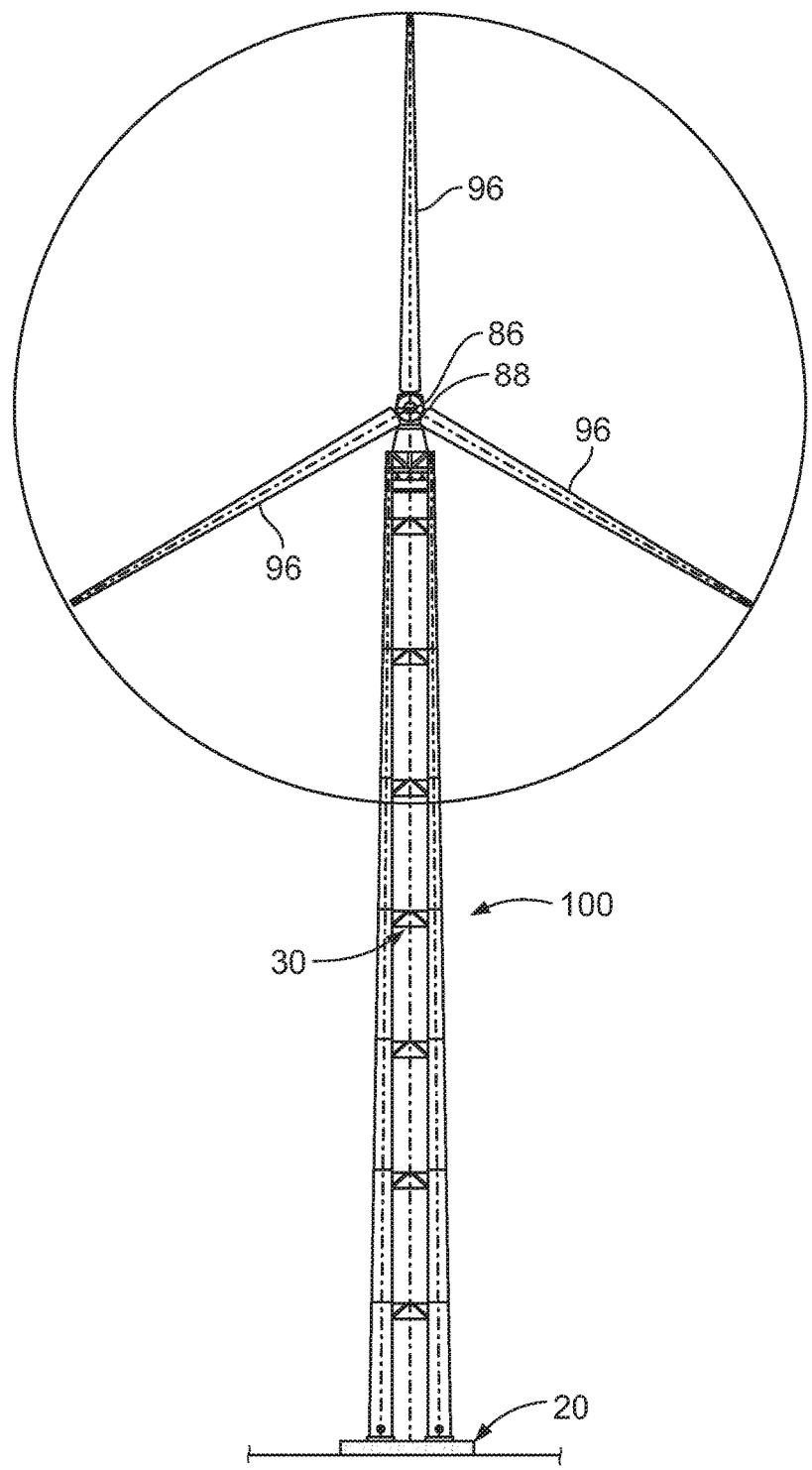
FIG. 1A is an elevation view of the first embodiment of the present invention from the front as the alignment of the nacelle is pointed towards the observer, depicting a plurality of tower support columns with structural bracing between columns as required by design and the nacelle and blades atop the tower showing the rotational sweep of the blades.
Figure 1B:
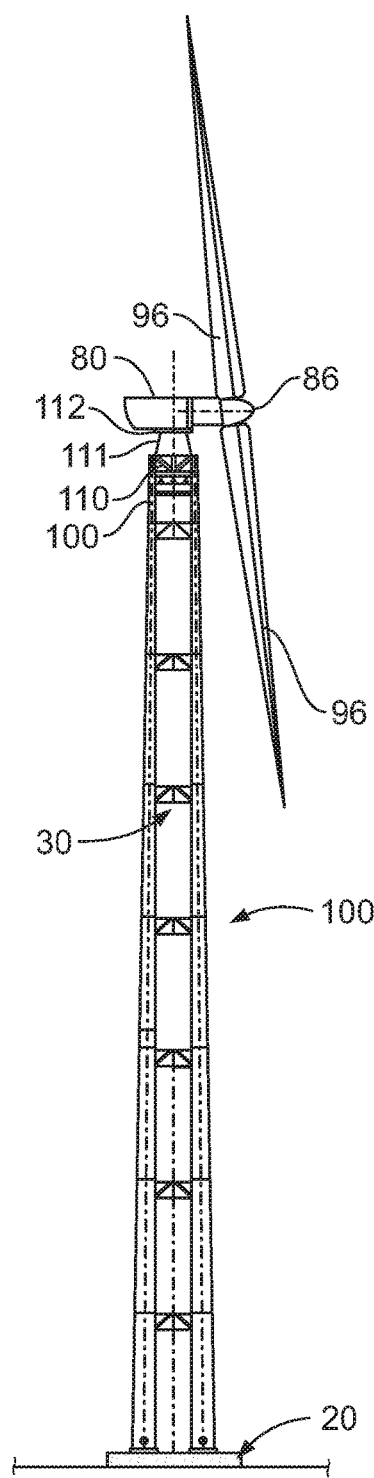
FIG. 1B is an elevation view of the first embodiment of the present invention from the side as the alignment of the nacelle is to the side, depicting the plurality of tower support columns with structural bracing between columns as required by design and the nacelle and blades atop the tower.

FIGS. 1A and 1B show front and side elevation views of a multi-column wind tower 100 having intermediate lateral bracing 30 between columns. Atop the multi-column wind tower 100 is the generating machinery assembly 80 comprising the nacelle 82, the hub 86 having the rotor 88 connecting the blades 96 to the hub 86. This view also shows the swept area of the blades 86 as they rotate. The tower 100 is disposed on top of and coupled to the base foundation 20.

Figure 2:
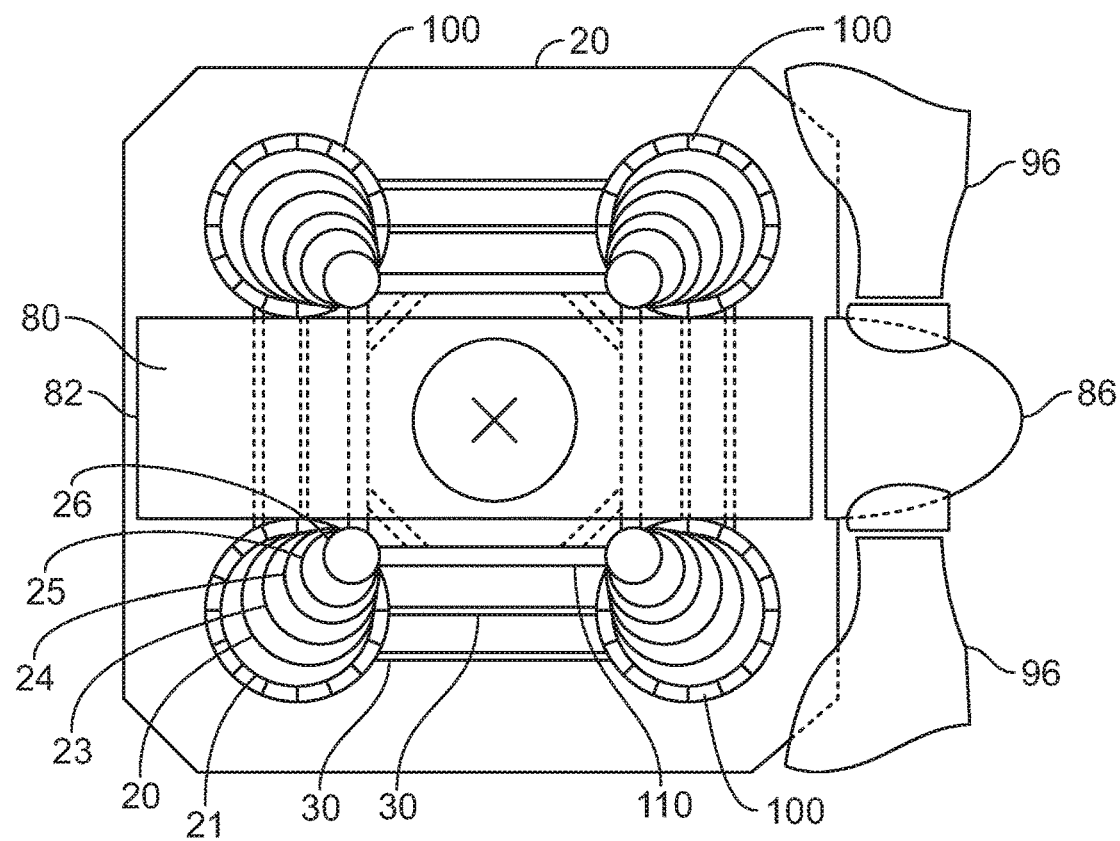
FIG. 2 is a plan view of the first embodiment of the present invention from above the tower showing the base foundation with the four structural tapered cylindrical tower columns spaced sufficiently to permit the nacelle housing between columns and the mechanism hub and blades extending beyond the columns.

FIG. 2 shows a plan view of the multi-column tower 100 as viewed from above. The blades 96 are coupled to the hub 86/rotor 88 that is in turn coupled to the nacelle 82. From this view it can be seen that the generating machinery assembly 80 is configured to fit in the void between the multiple columns 101, 102, 103, 104 of multi-column wind tower 100. The columns 101, 102, 103, 104 comprise stacked individual tapered sections 21, 22, 23, 24, 25, 26, wherein each successive layer tapers in diameter from cylinder base to cylinder top. One of skill in the art would understand that the more individual tapered cylinders that are stacked, the taller each column 101, 102, 103, 104 may become. It is also understood that tapered cylinder or stackable conical frustum shape is merely an example of a tapered shape to be stacked. One of skill in the art may substitute other known stackable three dimensional blocks to construct a column including but not limited to blocks of tapering cross-sectional areas and blocks having cross-sectional areas such as square, rectangle, circular, elliptical, polygonal, and irregular polygonal. Between the sections of tower columns 101, 102, 103, 104 are the intermediate bracing assemblies 30. The generation machinery assembly 80 is configured to be coupled to the top of the multi-column tower 100 through a structural frame 110.

Figure 3:
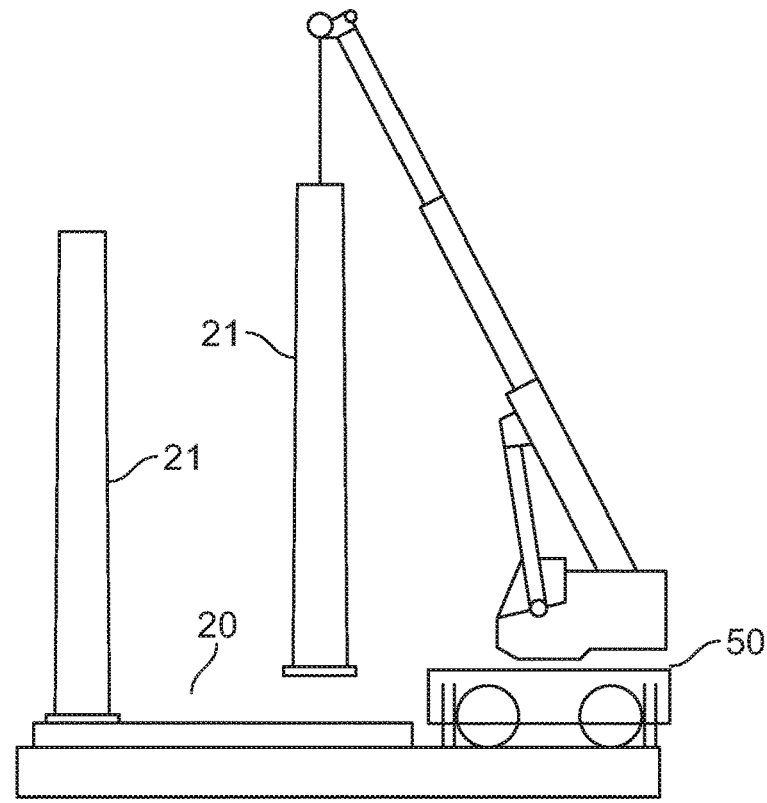
FIG. 3 is an elevation view of the first embodiment of the present invention illustrating that a small rough terrain type mobile crane can be utilized to erect the base sections of the tower columns onto the tower base foundation.

FIG. 3 shows an elevation view of the individual base tapered sections 21 being erected. These sections 21 may be fabricated at a remote manufacturing facility and have a base that could be transported within normal highway or railway constraints and brought to the final tower location on transport truck and trailer. The small crawler, truck, or rough terrain crane 50 is configured to be sufficient capacity to lift these base sections 21 of the column 101 and set them individually on top of the tower base foundation 20 where they would be coupled to said foundation 20.

Figure 4:
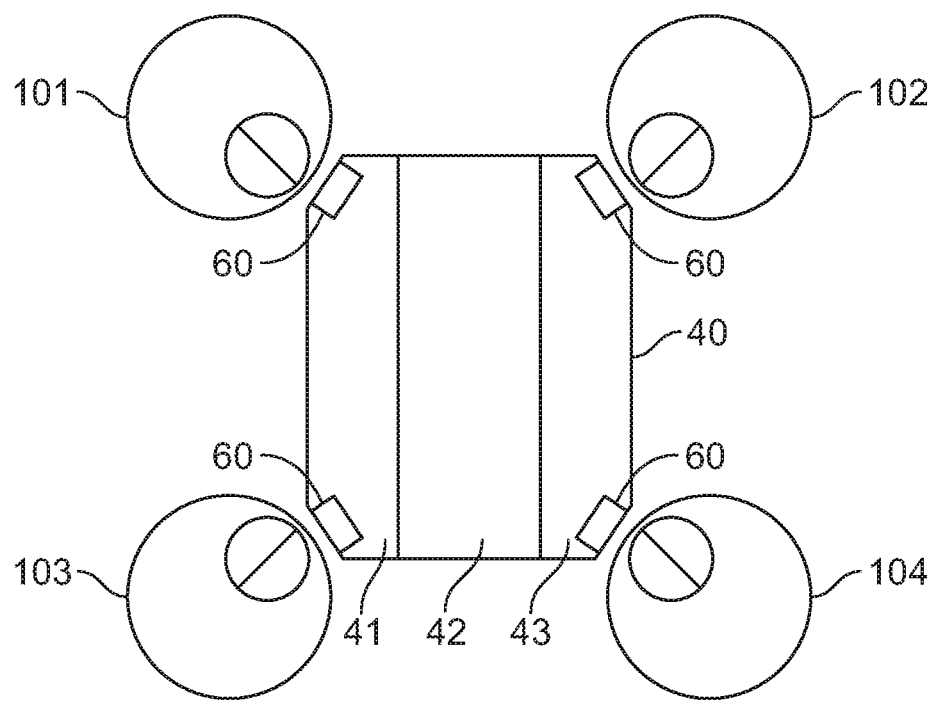
FIG. 4 is a plan view of the first embodiment of the present invention illustrating the lift deck consisting of transportable components that are nested together in their final alignment in the space between the four final tower columns.

FIG. 4 shows a plan view from the top of a combination lift/work deck 40 configured to fit into the void between the multiple columns 101, 102, 103, 104 of the wind tower 100. The lift/work deck 40 comprises one or more assemblies 41, 42, 43 that could ship to the site within normal highway or railway transportation constraints and would be set between the tower columns 101, 102, 103, 104 using the crane 50 where they would be coupled to each other to form a complete lift/work deck 40. The lift/work deck 40 further comprises pinion drive units 60 mounted to the edges of the deck 40 and coupled to racks that are mounted onto each tower column 101, 102, 103, 104. These rack and pinion lift units 60 may be of the type that are standard for lifting work decks in the off-shore oil industry and may be hydraulic or electric drive.

Figure 5:
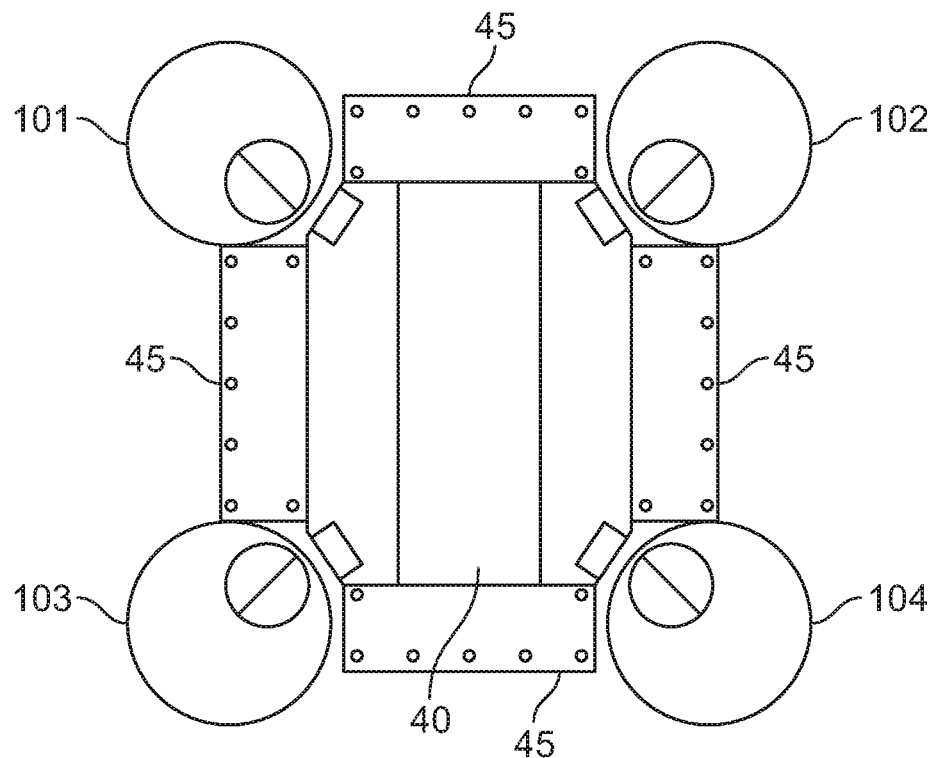
FIG. 5 is a plan view of the first embodiment of the present invention illustrating the lift deck in the space between the four final tower columns with the extendable work decks and their handrail and safety appurtenances so work crews can access broader work areas.

FIG. 5 shows a plan view from the top of the lift/work deck 40 assembled between the multiple tower columns 101, 102, 103, 104. Around the periphery are several extendable work platforms 45 extending off the sides of the platform 40. These work platforms 45 may additionally comprise standard safety features such as handrail, toe-boards, tie-off that would be required by the governing safety authorities. The platforms 45 may further extend outwards from the main lift/work deck 40 in order to increase the work area and access more parts of the multiple column tower columns 101, 102, 103, 104 as they are erected.

Figure 6:
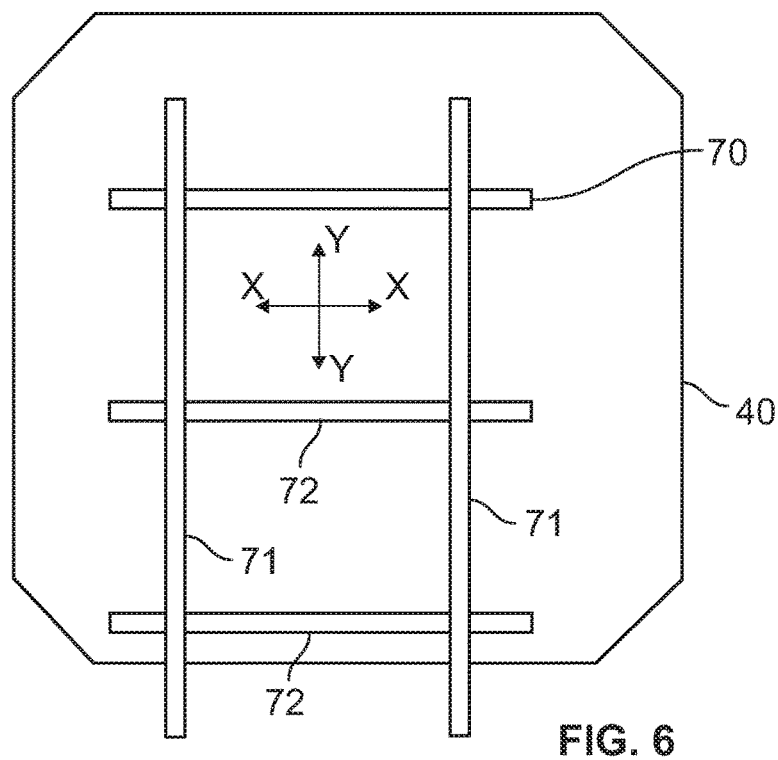
FIG. 6 is a plan view of the lift deck showing the support beams for the deck that are oriented along the X-X and Y-Y axis of the wind tower and permit movement in these directions on the top surface of the lift deck.

FIG. 6 shows a plan view from above of the translation mechanism 70 that is mounted onto the top side of the lift/work deck 40. Additionally, FIG. 6 shows the main beams 71 and 72 only as there are many types of these operating work decks that can translate horizontally. The standard moveable frame may be mounted to the top of lift/work deck 40 that would allow the top surface to move along the X-X and Y-Y axis as needed to maneuver the items that are placed on the top of the deck. As the heavy machinery parts are assembled on the top of the work deck their Center of Gravity (CG) will change and the loads into the rack and pinion drives 60 and the safety brakes will change. Clearances between the machinery and the tower columns 101, 102, 103, 104 will also change and the moveable frame 70 will allow movement to place the machinery assemblies in the optimum location.

Figure 7:
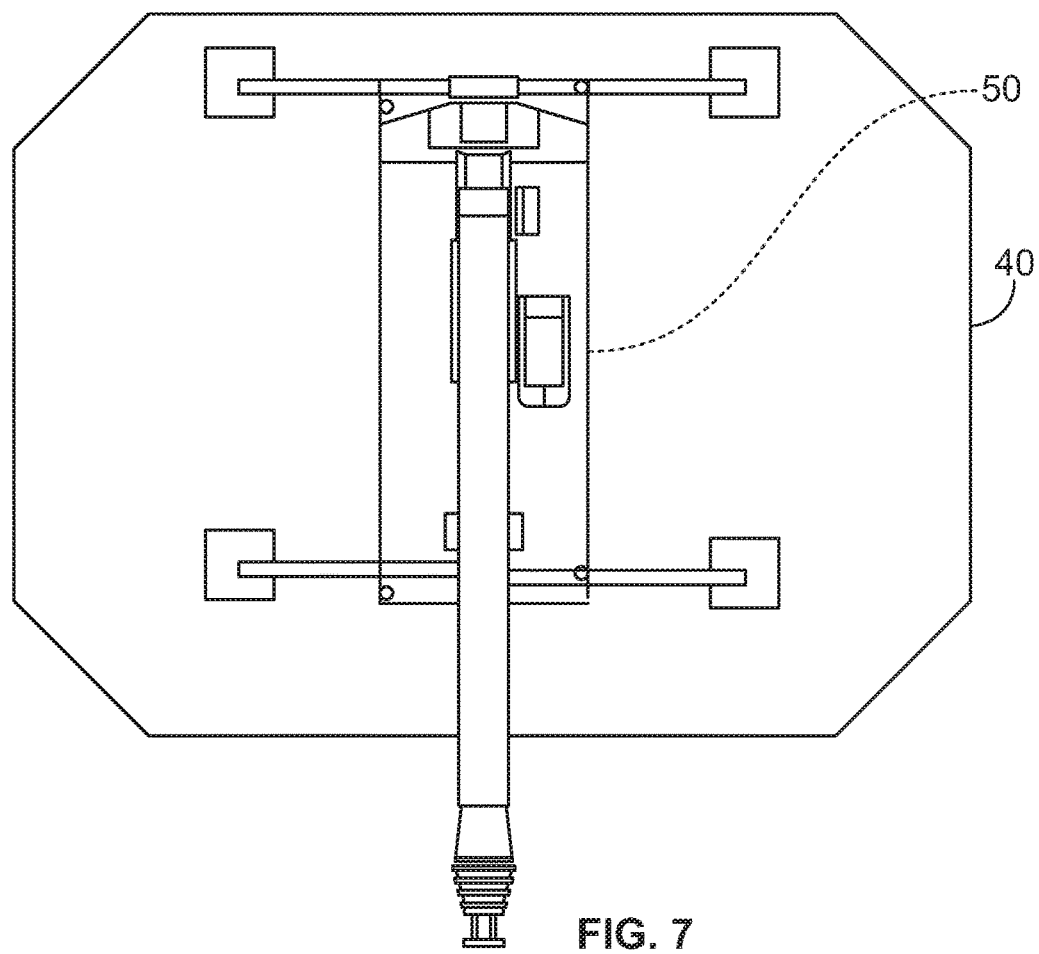
FIG. 7 is a plan view of the typical rough terrain type crane located on the surface of the lift deck and supported on its' outriggers in contact with the work deck surface.

FIG. 7 shows a plan view from above of a rough terrain crane 50 that has been placed on the work surface of the lift/work deck 40 and is coupled to the moveable surface of that deck 40 so it can be moved along the X-X or Y-Y axis as required using the translation mechanism 70. One of skill in the art would recognize that the rough terrain crane 50 shown can be of another type crane such as truck or crawler crane and not change the intent of mounting a crane 50 on the lift/work deck 40.

Figure 8:
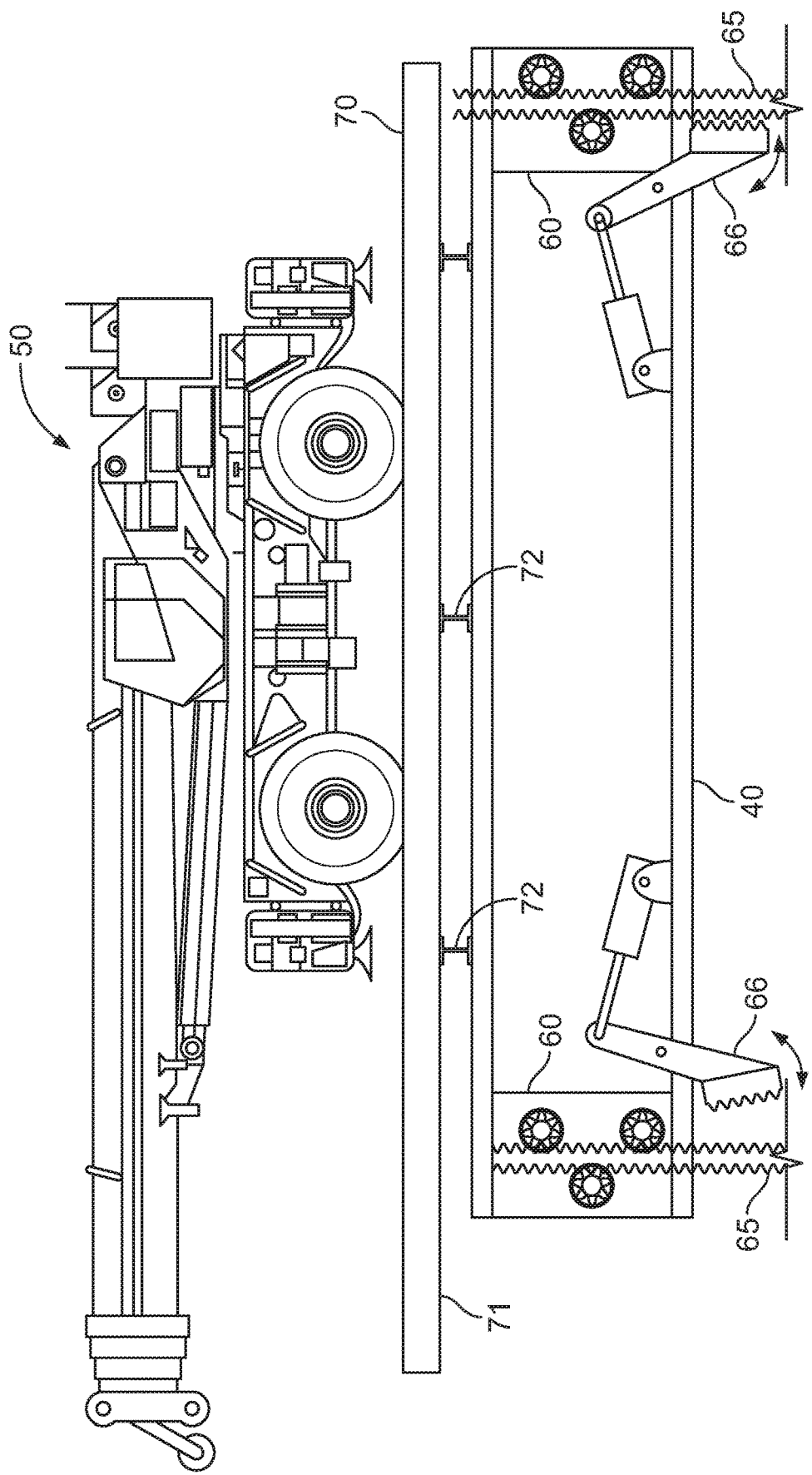
FIG. 8 is an elevation view through the lift deck and work deck showing the elevation view of a typical rough terrain type crane that is set on the top of the work deck that is immediately above the support beams that allow for horizontal movement in the X-X and Y-Y axis. The section through the lift deck shows that it has the pinion drives for lifting mounted to the deck and the pinion gear in contact with the racks that would be mounted on each of the tower final support columns. It also has locking mechanisms that would secure the lift deck at various elevations where work might occur on the work deck.

FIG. 8 shows an elevation view through the lift/work deck 40 and the rough terrain crane 50 mounted on the top surface of the moveable work deck 70. Support beams 71 and 72 allow the work surface 70 to translate along the X-X and Y-Y axis as necessary. In this embodiment, the lift/work deck 40 comprises pinion drive mechanisms 60 coupled at the corners as indicated in FIG. 4. The pinion drive mechanisms 60 may be of several types that are in standard use in the offshore oil industry for lifting the work. The cogs of the pinion drives 60 are configured to mate with the rack plates 65 that would be mounted to the sides of the multiple tower columns 101, 102, 103, 104. Activation of the drives 60 raises or lowers the lift/work deck 40 up or down the tower columns 101, 102, 103, 104. The work deck 40 is held at specific elevations to accomplish work tasks and the safety lock mechanism 66 is activated to engage with the rack plates 65 to provide back-up support without totally relying on the drive mechanisms 60. One of skill in the art would understand that there are many potential types of locking mechanisms 66 currently used in the oil industry that may be activated to lock the platform 40 at specific elevations.

Figure 9:
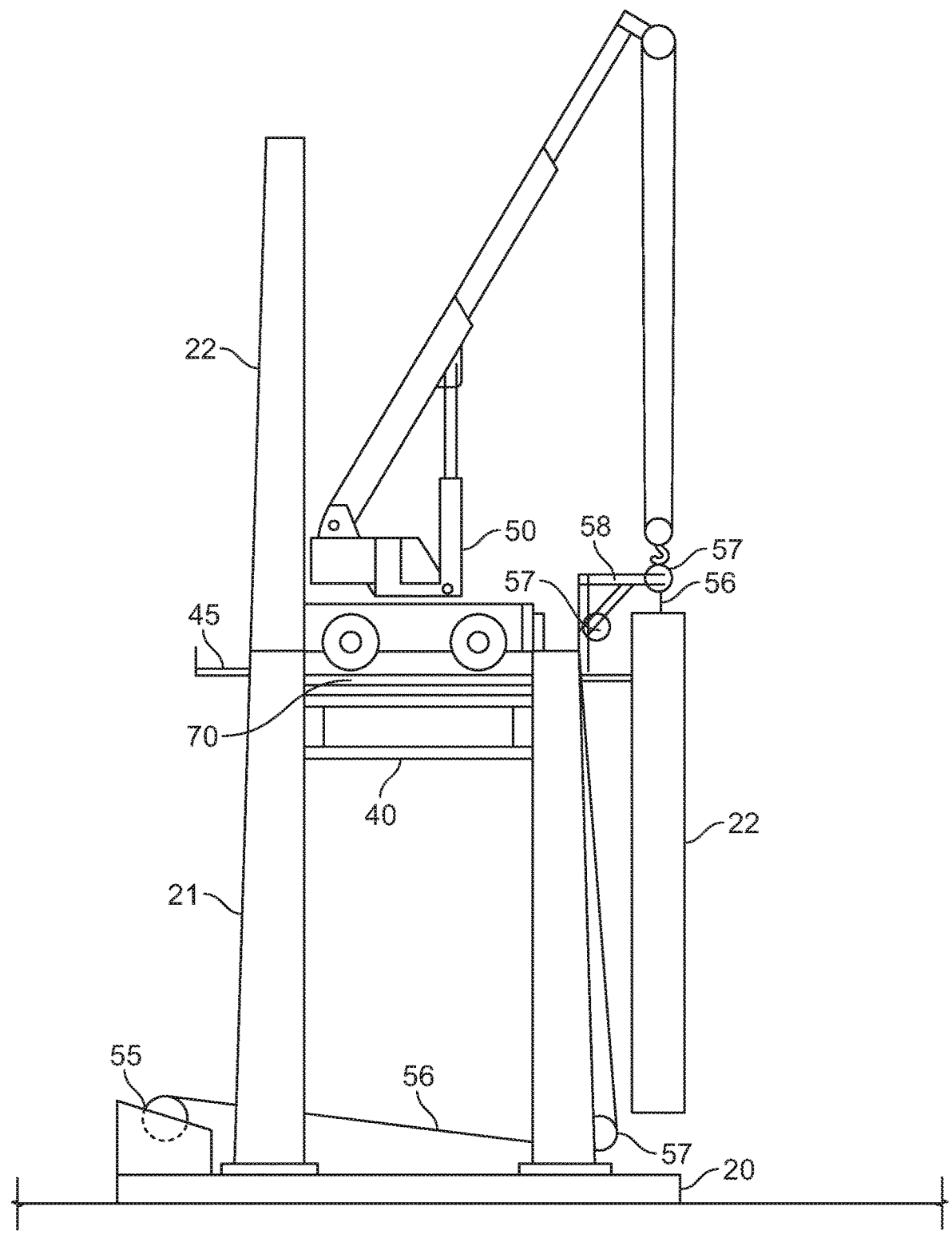
FIG. 9 is an elevation view of the first embodiment of the present invention showing the rough terrain crane mounted on top of the work deck that has been lifted to a new work elevation where the crane can lift the intermediate column sections for placement on top of the lower and preceding final tower column sections. A ground-based drum hoist is mounted on the foundation with lift cable deflected through various deflector sheaves up to a davit that is mounted onto the work deck and allows separate work crews to lift the sections of final tower columns up to the current work elevation where the rough terrain crane can take over the lift to set in final location.

FIG. 9 shows an elevation view of the bottom of the multi-column tower 100 as it is being erected above the first base tower sections illustrated in FIG. 3. The base column sections 21 have been installed as indicated in FIG. 3 and the lift/work deck 40 installed between the column sections 21 and the rough terrain crane 50 mounted on the top work surface of the lift/work deck 40. The lift/work deck 40 is lifted by means of the drive mechanisms 60 climbing the rack plates 65 until it reaches the optimum work elevation near the top of the column sections 21 and work/lift deck 40 is locked for safety there by means of the locking mechanisms 66. The rough terrain crane 50 is rigged to the next tower section 22 and lifts it from the ground location and sets sections 22 on top of the previously erected tower sections 21 where they can be connectively attached. Once all four sections 22 are raised and erected on top of all four sections of columns 21 and attached, the lift/work deck can be raised to a location near the top of the sections 22 and locked into that elevation for work as previously described. This procedure is repeated and the additional towers sections 23 and greater are erected and connected.

At some elevation the wire rope rigging of the standard crane 50 with multi-part lines will not have sufficient cable length to retrieve tower columns sections from the ground. In this case, a drum hoist 55 may be mounted on the tower foundation 20 or similar hard point with rigging line 56 deflected through one or more deflection sheaves 57 up to a lift davit 58 that is mounted on the lift/work deck 40. A rigging crew may couple the lift cable 56 to the tower column section on the ground and use the drum hoist 55 to lift the tower section approximately to the elevation of the work deck 40. At this elevation the lift crew working with the rough terrain crane 50 can transfer the column section to the rough terrain crane load line for final erection. With this methodology the drum hoist system 55, 56, 57, and 58 is configured to allow sections of column to be lifted to a location for transfer to the erection crane 50 while that erection crane 50 is being used simultaneously to erect the prior column section.

The small and relatively inexpensive RT and drum hoist can be used to completely erect the multi-column tower columns 101, 102, 103, 104 to their final height. Once tower erection is complete. The lift/work deck 40 can use the rack and pinion mechanisms 60 and 66 to lower the lift/work deck 40 with lift crane 50 back to ground level. The tower may require lateral bracing assemblies 30 to be installed at various elevations in accordance with the tower design and specific load conditions. Lateral bracing assemblies 30, for example may be installed at the base of the tower columns serving as a support frame, middle of the tower columns, or the top between particular column segments. The work deck 40 and crane 50 can be used to install these lateral brace assemblies 30 as the tower is being erected or during the time that the deck 40 and crane 50 are being lowered. Only the lateral bracing 30 that are oriented parallel to the erection orientation of the nacelle erection would be installed at this time. The complete installation of all lateral bracing 30 could be postponed until after the nacelle has been lifted.

Figure 10A:
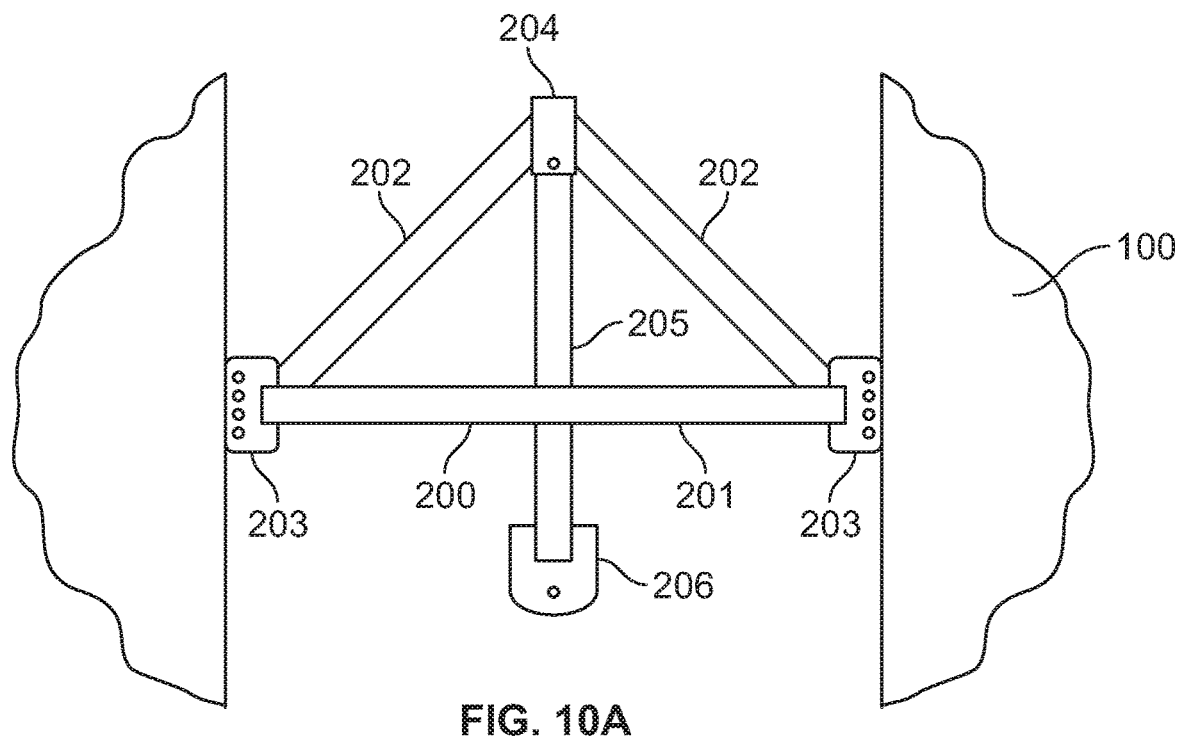
FIG. 10A is an elevation view of the first embodiment of the present invention with a structural support frame mounted between the four final tower columns having a vertical member with attachment means to the nacelle and diagonal braces that transmit the resultant nacelle load into the final tower support columns.

FIG. 10A shows an elevation view from the side of the temporary support frame 200 that is used to transfer load and provide support during the assembly of the topside machinery and connection structure. The frame 200 has horizontal structural members 201 that span between multiple tower columns 100 to which they are coupled by means of connecting devices 203. There are many types of existing connecting devices 203 that are standard in the assembly of structures. The frame 200 also has diagonal structural members 202 that connect at the corners of the horizontal structural members 201 at one end and together at a structural attachment connection 204 in the center of frame 200 and above the horizontal members 201. A structural member 205 would be connected at its top end to the connection mechanism 204 and hang in an approximate vertical orientation and having a connection detail 206 at the lower end for attachment to the nacelle machinery. The method of attachment of the vertical structural member 205 to the connection detail 204 would allow the structural member 205 to freely move at the bottom end in the X-X or Y-Y directions.

Figure 10B:
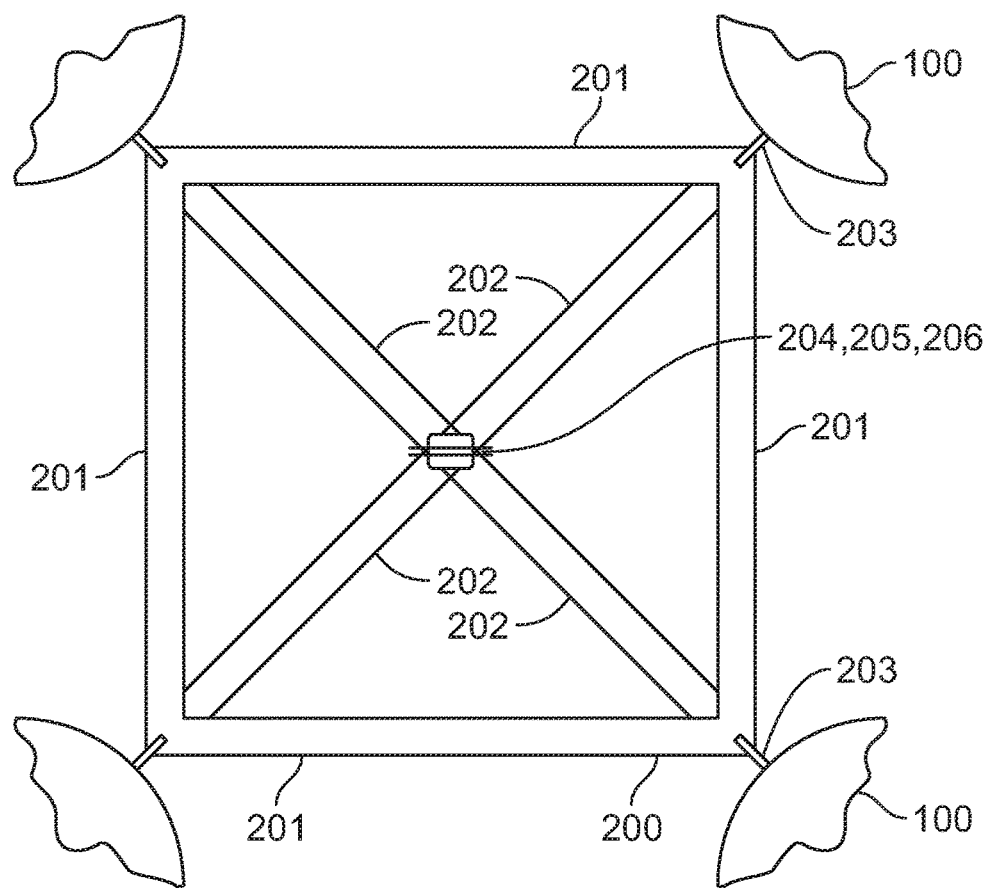
FIG. 10B is a plan view of the same structural support frame showing that it is located in the space between the four final tower support columns and connectively attached to them.

FIG. 10B shows the plan view from the top of the temporary support frame 200 as it attaches to the multiple tower columns 100 by means of the connectors 203. The diagonal members 202 are shown connected to the corners of horizontal members 201 and to each other at the center assembly 204. The vertical structural member 205 may be located at the center connected to the assembly 204 at the top and having connector 206 at its bottom. The temporary support frame 200 is made of components and in a fashion that it can be assembled from components that can disassemble for transport by normal truck or rail methods within normal transportation constraints.

Figure 11:
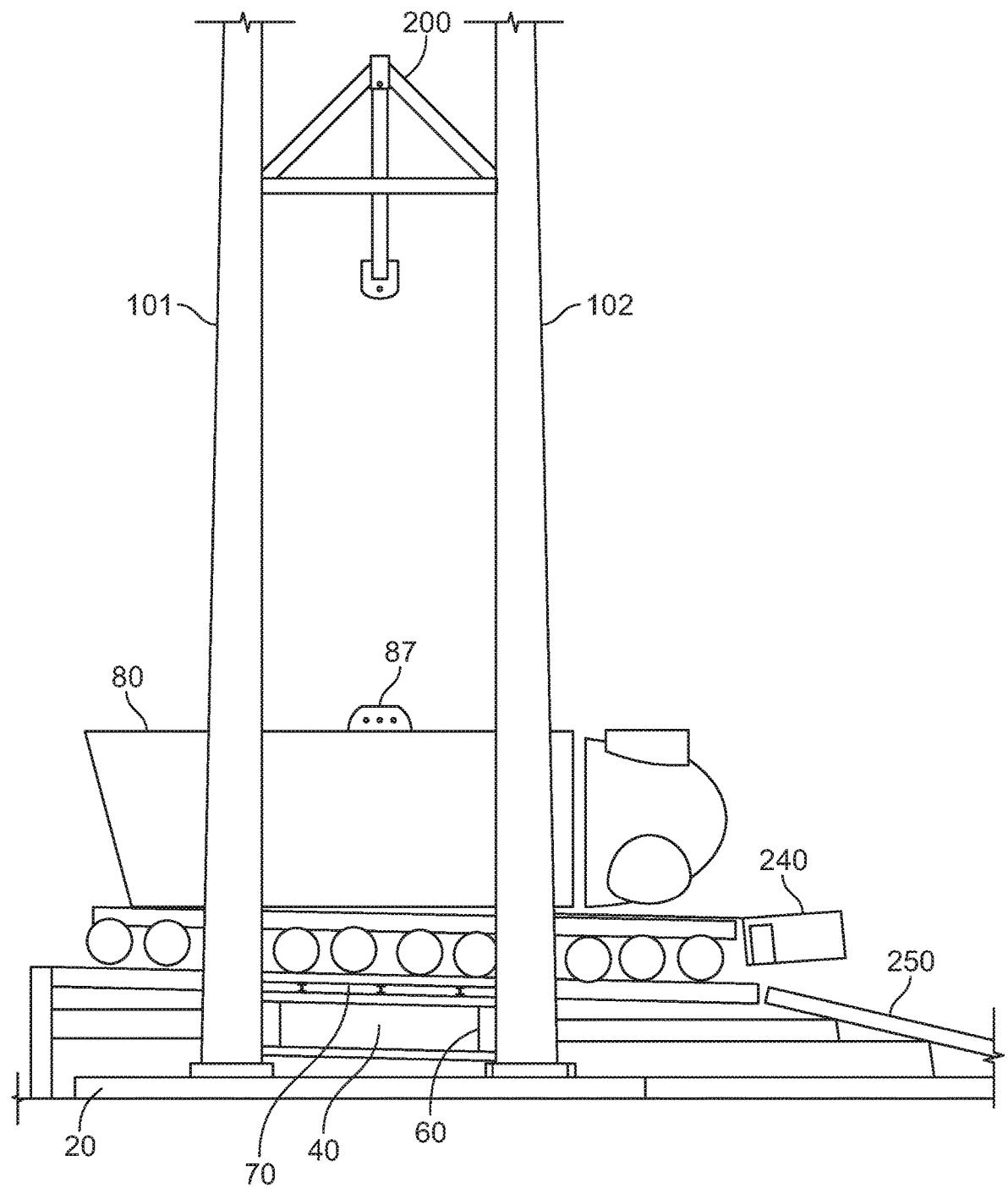
FIG. 11 is an elevation view of the first embodiment of the present invention showing the bottom sections of the final tower support columns with the temporary support frame mounted at the appropriate elevation above the lift deck. The nacelle has been transported to the space between the final tower support columns and sets on the transporter machine on top of the lift deck and mechanism for providing movement in the X-X and Y-Y axis. Cribbing or ramps may be utilized to provide proper access and additional load distribution for transport.

FIG. 11 shows a side elevation view of the erected multi-column tower with main columns 100 as it sets atop the base foundation 20. The lift deck 40 is position low between the columns 100 with pinion drives 60 connected to the columns 100 through the rack and pinion mechanisms 60 described in FIG. 8. Fill shown as 250 can be provided as crane mats, or structural fill, or ramps to provide vehicular access to the top of the lift deck 40. The machinery nacelle 80 may be brought to the tower location on transport industry standard Self-Propelled Motorized Transporters (SPMTs) or other typical transport means. The SPMTs can move the nacelle 80 to a location between the columns 101, 102, 103, 104 and atop the lift deck 40. The nacelle machinery 80 may comprise a lift lug 87 at the top for lifting at various locations along its transport path from the assembly facility.

Figure 12:
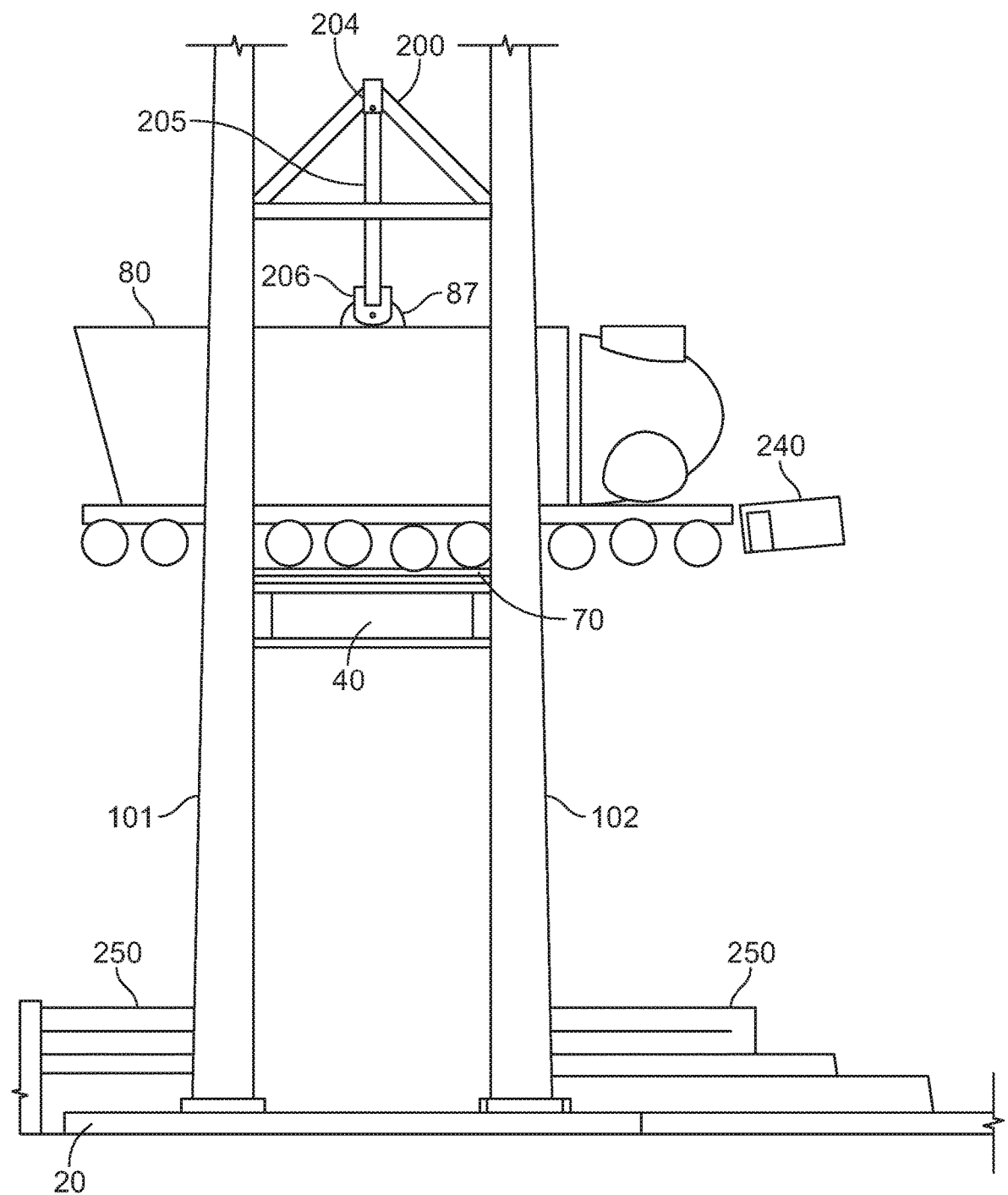
FIG. 12 is an elevation view of the first embodiment of the present invention showing the bottom sections of the final wind tower support columns with the lift deck having lifted the nacelle and additionally the transporters to an elevation necessary to connect the nacelle machinery to the temporary support frame that is mounted to the final tower support columns. A combination of the X-X and Y-Y movement mechanism, lift deck rack and pinion system and the transporter hydraulic lift system can provide the precise alignment required to connect the nacelle to the temporary support frame and hanger.

FIG. 12 shows the side elevation view of the multiple columns 101, 102, 103, 104 as they set on top of the base foundation 20. The lift deck 40 has lifted the SPMTs 240 and the nacelle machinery 80 to an elevation such that the nacelle 80 can be connectively attached to the temporary support frame 200 at the connection locations between 87 and 206. The vertical support member 205 can move in the X-X and Y-Y directions and the lift deck mechanism 70 can move in the X-X and Y-Y directions to provide the movements necessary to connect 206 to 87.

Figure 13:
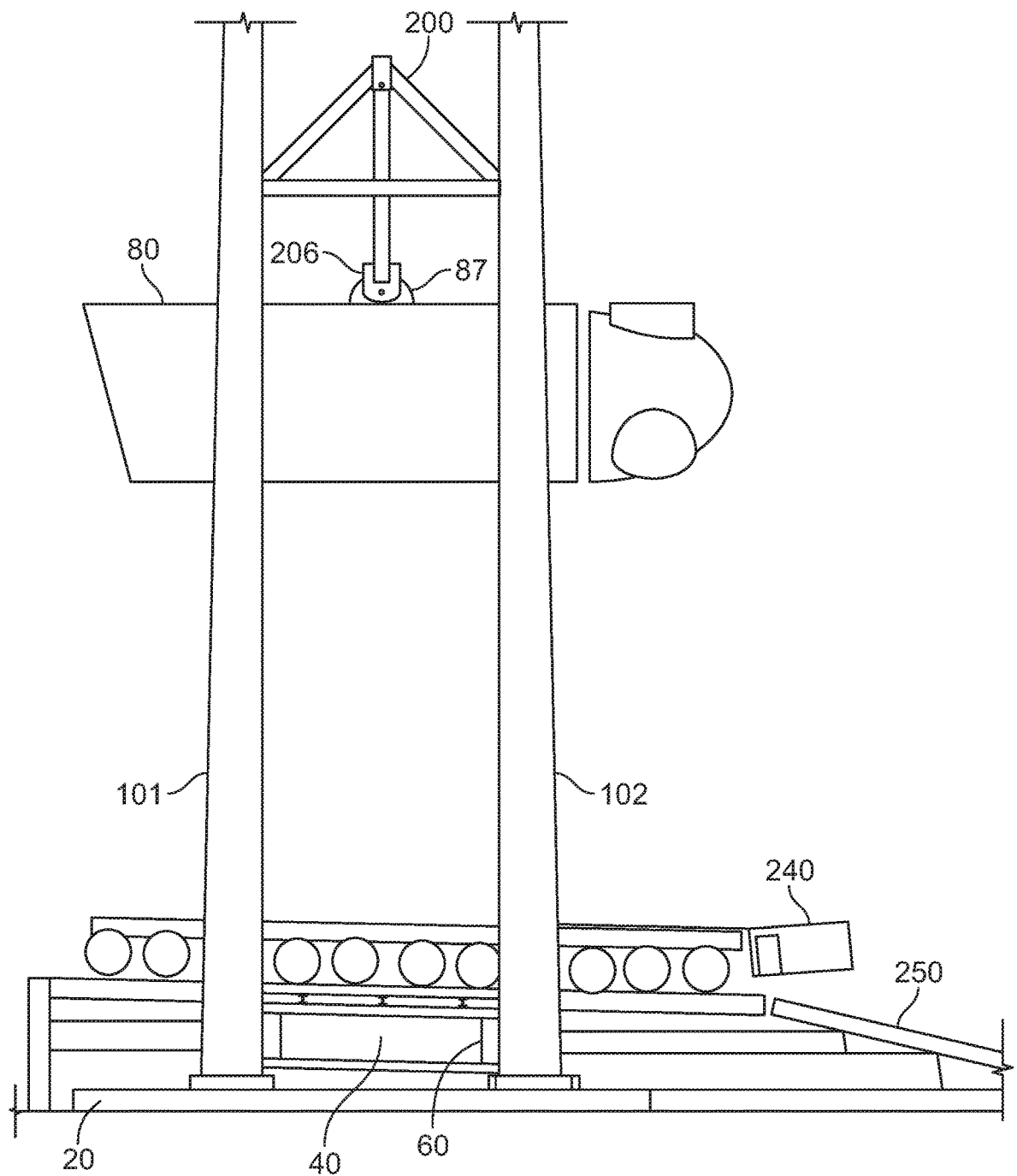
FIG. 13 is an elevation view of the first embodiment of the present invention showing that the lift deck can lower the transporter back to grade elevation once the nacelle has been connected to the temporary support frame that is connected to the final tower support columns.

FIG. 13 shows a side elevation view of the multiple columns 101, 102, 103, 104 with the nacelle machinery 80 suspended from the temporary frame 200 by connection between 87 and 206. The lift deck 40 has been lowered using the drive machinery 60 and moving the SPMTs 240 to the top of the vehicular support fill 250 where they can be driven away.

Figure 14:
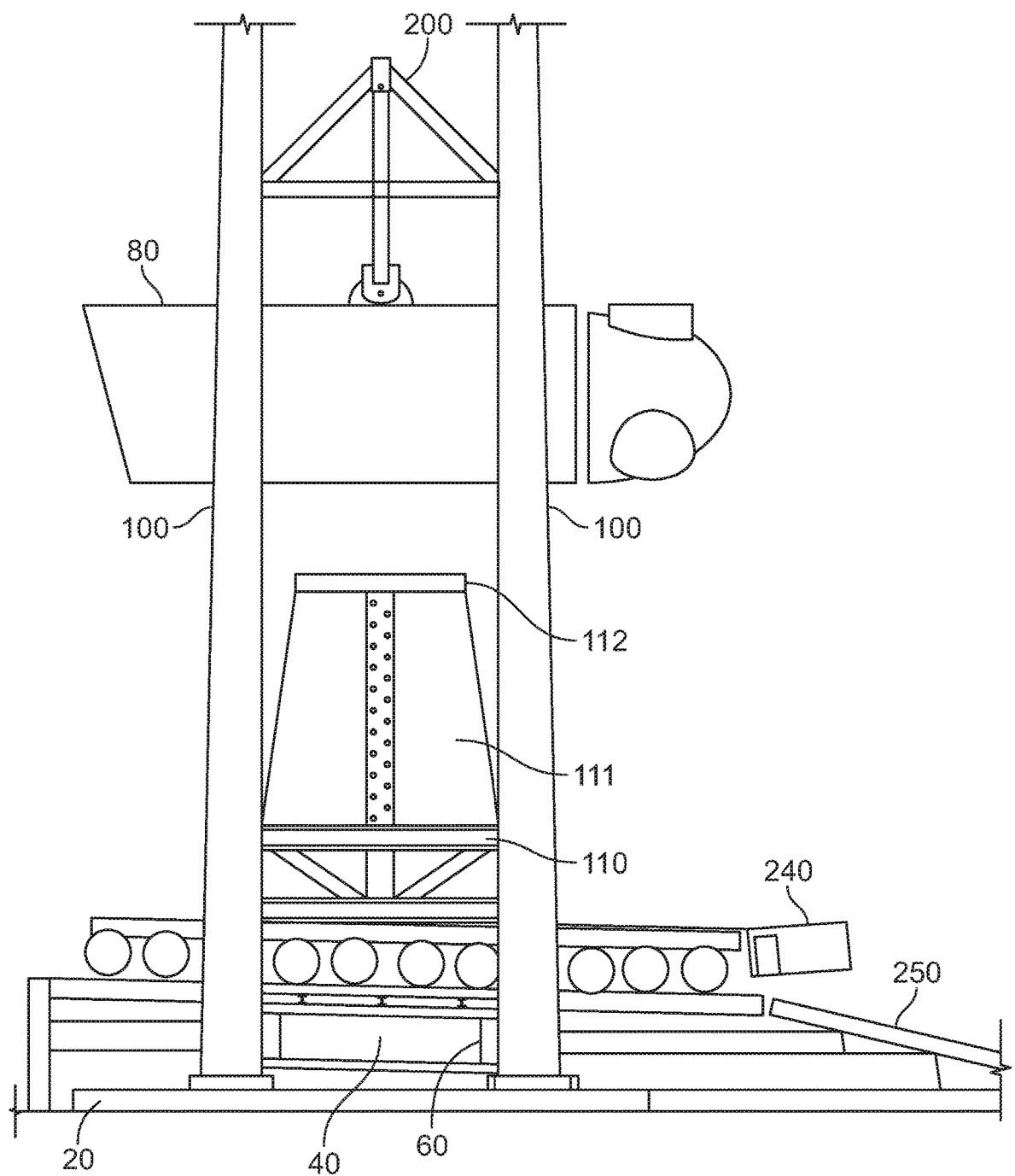
FIG. 14 is an elevation view of the first embodiment of the present invention showing that the transporter mechanism can bring the structure for connecting nacelle to final tower into the same location between the four final tower support columns and below the suspended nacelle mechanism.

FIG. 14 shows a side elevation of the multiple columns 101, 102, 103, 104 as they set atop the base foundation 20 with the lift deck 40 in the lower position between the columns 101, 102, 103, 104. The vehicular structural fill 250 has been used so the SPMTs 240 can be used to bring the assemblies for connecting the nacelle machinery 80 to the top of the multiple columns 101, 102, 103, 104 to a location between the multiple columns 101, 102, 103, 104. The nacelle machinery 80 must be able to rotate through 360 degrees about the vertical axis of the tower and the standard wind industry method is with the use of a yaw ring 112 that currently connects the nacelle 80 to the monopole tower. That yaw ring 112 mates to a similar device in the base of the nacelle assembly 80. The yaw ring 112 connected to the top of a truncated cone assembly 111 that is made up of formed plates that are connectively attached to each other to form the entire cone. The truncated support cone 111 is coupled atop a structural frame 110 that would connect to the top of each of the multiple columns 101, 102, 103, and 104. There are many types of structural frames 110 that are used in the petroleum refining industry to support heavy process vessels from vertical structural support columns. Many of these alternate type structural support frames can be used for this purpose interchangeably.

Figure 15:
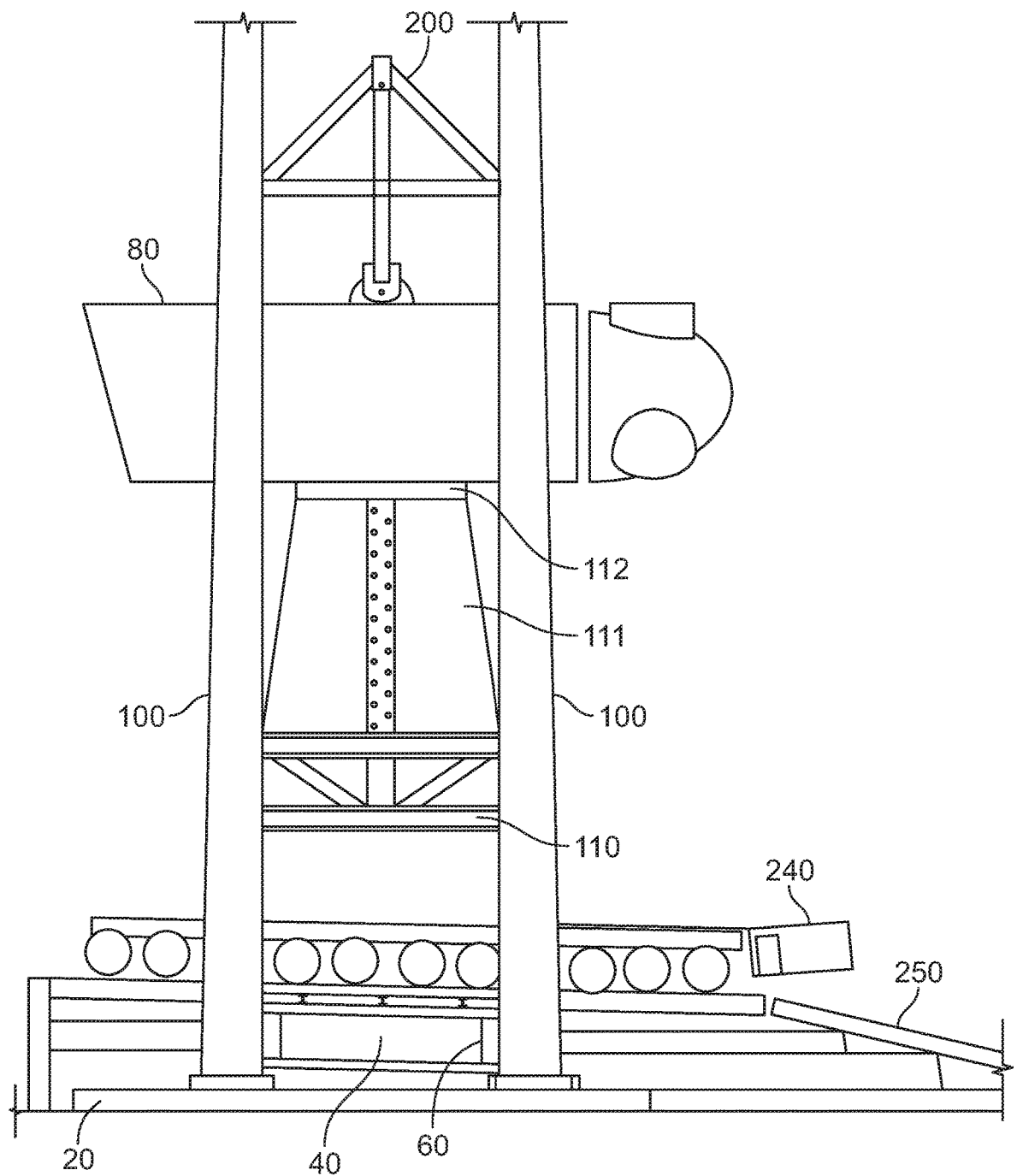
FIG. 15 is an elevation view of the first embodiment of the present invention showing that the transporter mechanism and the structure for connecting nacelle to final tower can be lifted by the lift deck where the structure is connected to the lower section of the nacelle mechanism and the transporter can then be lowered to grade after this assembly is connected to the nacelle.

FIG. 15 shows a side elevation view of the multiple columns 101, 102, 103, 104 as they set atop the base foundation 20. The lift deck 40 has been used to lift the assemblies 110, 111, and 112 vertically until the yaw ring 112 can be coupled to the mating assembly in the nacelle machinery 80 that is supported by the temporary frame 200. Once the yaw ring 112 has been coupled to the nacelle machinery 80 the lift deck 40 can use pinion drive assemblies 60 to lower the SPMTs 240 back to their lower elevation where the SPMTs 240 can be driven off the vehicular fill 250.

Figure 16:
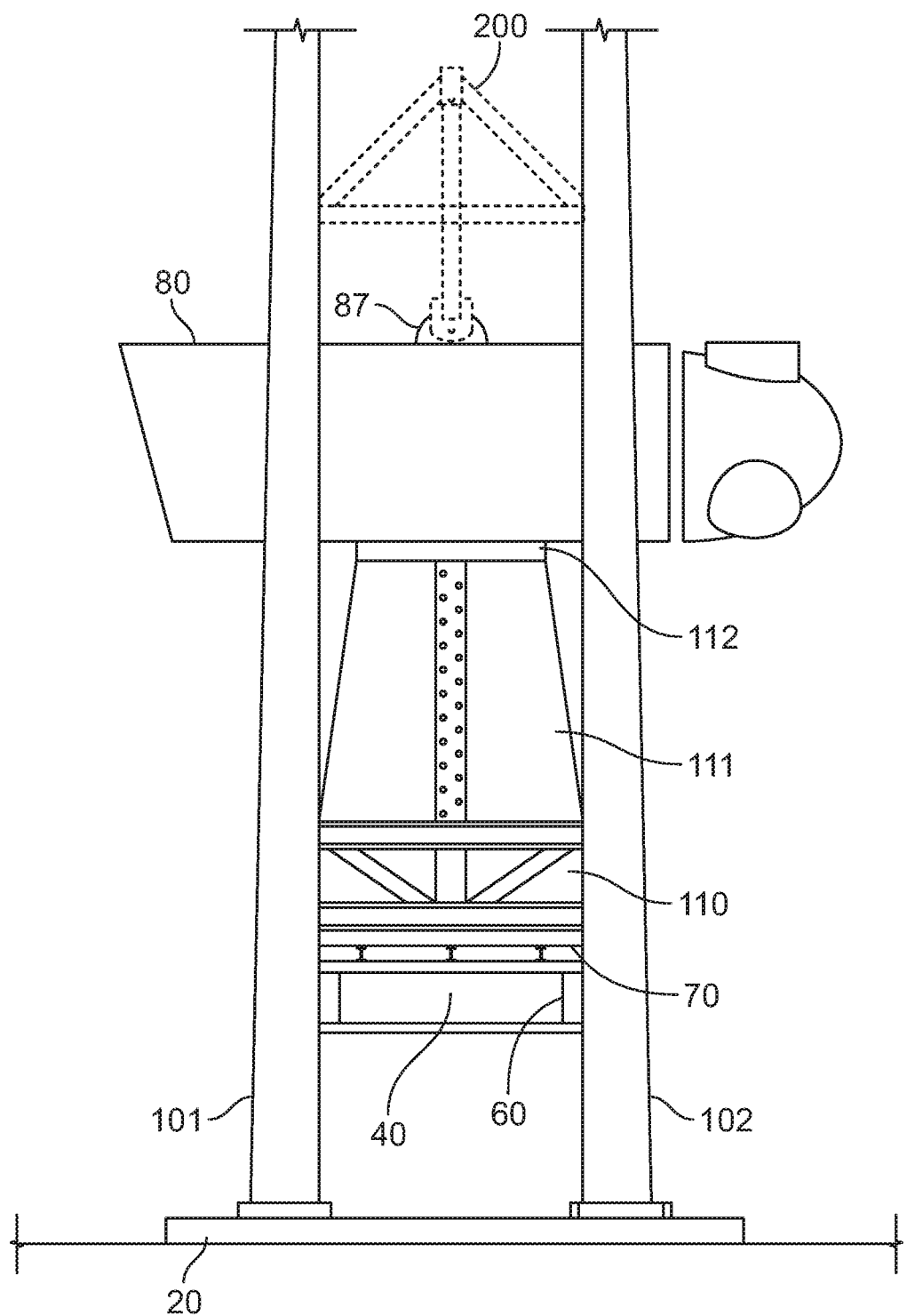
FIG. 16 is an elevation view of the first embodiment of the present invention showing that the lift deck can be raised to contact the underside of the nacelle to final tower structure assembly to support the entire load. The temporary transporter load distribution system at grade can be removed. The temporary top side mechanism support frame above the nacelle can be removed by a small capacity crane from grade.

FIG. 16 shows a side elevation view of the multiple columns 101, 102, 103, 104 as they set atop the base foundation 20. The lift deck 40 has been raised by the drive mechanisms 60 to an elevation where the translation deck 70 is in contact with the structural frame 110 and supports the entire weight of the nacelle machinery 80 and its support and connection assemblies 110, 111, and 112. A crane 50 can be used to remove the temporary support frame 200 from above the machinery. During the assembly of the various heavy machinery and structural assemblies 82, 86, 88, 96, 110, 111, and 112 the Center of Gravity will change and the loading on the lift drive units 60 will change. The movable deck assembly 70 will be used to position these loads as necessary for load distribution, stability, and clearances.

Figure 17:
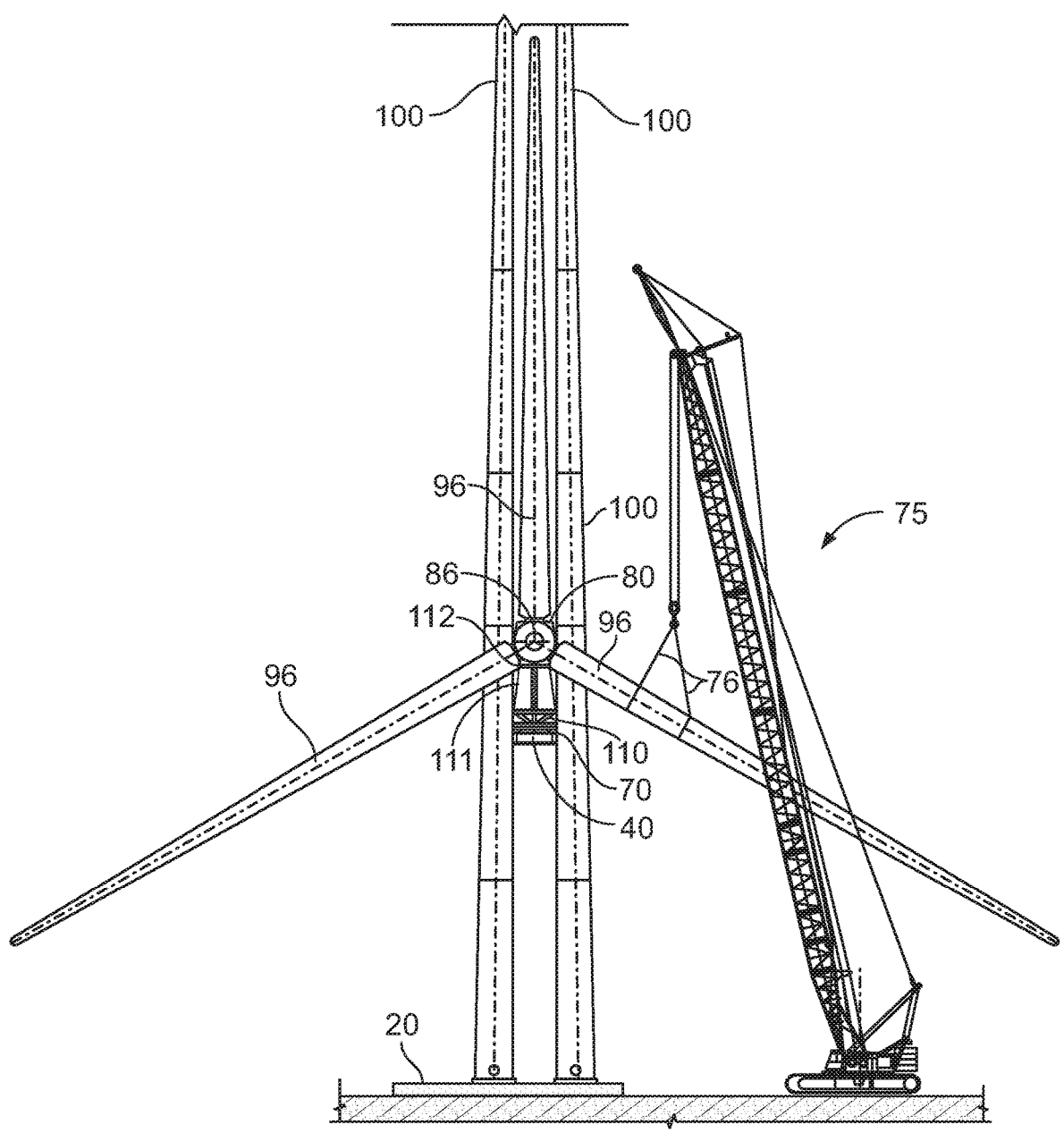
FIG. 17 is an elevation view of the first embodiment of the present invention showing that the lift deck or the temporary support frame above the nacelle can be used to temporarily support the top side mechanism at a specific intermediate elevation while a small capacity ground based crane can be used to install the blades to the hub or rotor.

FIG. 17 shows a front elevation view of the multiple columns 101, 102, 103, 104 as they set atop the base foundation 20 with the nacelle machinery 80 supported by the lift deck 40 as shown in FIG. 16. A ground-based crane 75 may be used with rigging 76 to lift and place the blades 96 for connection to the hub 86. Once all machinery associated with the nacelle 80 has been installed, the lift deck 40 can be used to lift the assemblies to the top of the multiple columns 101, 102, 103, 104 for attachment and completion as shown in FIGS. 1A and 1B.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

The invention claimed is:

1. A wind turbine tower comprising:
   a plurality of columns, wherein each column of the plurality of columns comprises a column base and a column top;
   the plurality of columns arranged in a geometric shape on a wind turbine tower base, wherein no column of the plurality of columns is centrally disposed within the geometric shape and wherein at least two columns of the plurality of columns have a column spacing width to accommodate a nacelle housing assembly;
   a lift deck platform disposed within the geometric shape of the plurality of columns on the wind turbine tower base, the lift deck platform coupled to a plurality of lift mechanisms, the plurality of lift mechanisms coupled to at least two columns of the plurality of columns, the plurality of lift mechanisms extending from substantially the column base to substantially the column top of each column of the at least two columns, the plurality of lift mechanisms configured to raise and lower the lift deck within the geometric shape of the plurality of columns along a vertical axis of the wind turbine tower;
   a structural support frame coupled to substantially the column tops of the plurality of columns; and
   a nacelle housing assembly coupled to the structural support frame.

2. The wind turbine tower of claim 1 further comprising at least one lateral bracing member coupling at least two columns of the plurality of columns along a perimeter of the geometric shape.

3. The wind turbine tower of claim 2 wherein wind turbine tower has a tower height of at least 85 meters.

4. The wind turbine tower of claim 1 wherein each column of the plurality of columns further comprises a plurality of successively stacked column segments coupled together to form each column and column height.

5. The wind turbine tower of claim 4 wherein each column segment of the plurality of successively stacked column segments has a width less than 5 meters.

6. The wind turbine tower of claim 4 wherein each column segment has a column segment top and a column segment bottom and further wherein each column segment comprises a cross-sectional area taper from column bottom to column top.

7. The wind turbine tower of claim 4 wherein each column projects from column bottom to column top at an angle towards a center of the geometric shape.

8. The wind turbine tower of claim 1, wherein the plurality of lift mechanisms comprise mounted rack plates and the lift deck platform additionally comprises a plurality of pinion drives coupled to the mounted rack plates.

9. The wind turbine tower of claim 1 wherein the lift deck platform additionally comprises a translation deck coupled to the lift deck platform, the translation deck configured to translate in directions parallel to the wind turbine tower base.

10. The wind turbine tower of claim 1 wherein the lift deck platform additionally comprises at least one expandable work deck having a width less than the column spacing width, the at least one expandable work deck coupled to the lift deck platform and configured to project from a perimeter side of the lift deck.

11. The wind turbine tower of claim 1 wherein the geometric shape is substantially rectangular comprising at least four columns.

12. A method to erect a wind turbine tower comprising the steps of:
   a. providing a wind turbine tower base;
   b. coupling a first plurality of column segments to the wind turbine tower base forming a geometric shape wherein no column segment of the plurality of column segments is centrally disposed within the geometric shape and wherein at least two adjacent column segments of the first plurality of column segments have a column spacing width to accommodate a nacelle housing assembly;
   c. coupling a lifting mechanism to at least two column segments of the first plurality of column segments and coupling a lift deck to the lifting mechanism, wherein the lift deck is centrally disposed with the geometric shape and the lifting mechanism is configured to lift and lower the lift deck along a vertical axis of the wind turbine tower;
   d. forming a plurality of columns, each column having a column base and a column top, by disposing at least one column segment of a second plurality of column segments onto the lift deck, lifting the lift deck to a column segment height of the first plurality of column segments, coupling the at least one column segment of the second plurality to a column segment of the first plurality of column segments and extending the lifting mechanism onto the at least one column segment of the second plurality of column segments;

e. coupling the nacelle housing assembly to a structural support frame; and
f. coupling the structural support frame to the column tops of the plurality of columns.

13. The method to erect a wind turbine tower of claim 12 wherein the step of coupling a lift deck further comprises coupling an extended platform to the lift deck, the extended platform configured to project outward from a side of the lift deck.

14. The method to erect a wind turbine tower of claim 12 wherein the step of coupling a lift deck further comprises coupling a translation deck to the lift deck wherein the translation deck is configured to translate in direction parallel to the wind turbine tower base.

15. The method to erect a wind turbine tower of claim 12 further comprising the step of disposing support members onto the lift deck, lifting the support members to a column height, coupling the support members between two columns of the plurality of columns.

16. The method to erect a wind turbine tower of claim 12 wherein the step of coupling at least one column segment of the second plurality of column segments comprises using a crane to lift the at least one column segment of the second plurality of column segments onto a previously coupled column segment of the first plurality of column segments or disposing a crane onto the lift deck, raising the lift deck, and using the crane to lift the at least one column segment of the second plurality of column segments onto a previously coupled column segment of the first plurality of column segments; further wherein the step of forming a column includes repeating the coupling step with additional column segments coupling to previously coupled column segments.

17. The method to erect a wind turbine tower of claim 12 wherein the step of coupling the nacelle housing assembly to the structural support frame comprises the steps of:
a. providing a temporary support frame comprising a plurality of horizontal structural members configured to couple to and between the plurality of columns, a plurality of diagonal structural members configured to couple at corners of intersecting horizontal structural members through the center of the temporary support frame, and further comprising at least one vertical support member coupled to the diagonal members configured to run parallel to the vertical axis of the wind turbine tower;
b. disposing the temporary support frame onto the lift deck, lifting the lift deck to the column tops, coupling the temporary support frame to the plurality of columns to the column tops or proximal the column tops and lowering the lift deck;
c. disposing the nacelle housing assembly onto the lift deck, lifting the lift deck proximal the vertical support member, coupling the nacelle housing assembly to the vertical support member and lowering the lift deck;
d. disposing the structural support frame assembly onto the lift deck, lifting the lift deck to the proximal the column tops, coupling the structural support frame assembly to the nacelle housing assembly;
e. uncoupling the temporary support frame from the nacelle housing assembly and removing the temporary support frame from the wind turbine tower;
f. lifting the structural support frame assembly frame and nacelle housing assembly with the lift deck to the column tops; and
g. coupling the structural support frame assembly to the plurality of columns and lowering the lift deck.

18. The method to erect a wind turbine tower of claim 17 wherein the step of disposing the structural support frame assembly onto the lift deck further comprises the step of disposing a structural support frame assembly having a structural support frame base coupled to a truncated support cone top wherein the nacelle housing assembly is coupled to truncated support cone.

19. The method to erect a wind turbine tower of claim 12 wherein the geometric shape is substantially rectangular comprising at least four columns.

20. The method to erect a wind turbine tower of claim 16 wherein each column segment comprises a tapered column width from a column segment base to a column segment top.

* * * * *